United States Patent [19]

Kypris

[11] Patent Number: 4,967,789
[45] Date of Patent: Nov. 6, 1990

[54] AUTOMATIC IRRIGATION REGULATOR CONTROLLED BY WATER EVAPORATION

[76] Inventor: Dedalos C. Kypris, 9 Thivon Str., Aglanjia, Nicosia, Cyprus

[21] Appl. No.: 315,333

[22] Filed: Feb. 24, 1989

[30] Foreign Application Priority Data

Feb. 29, 1988 [GR] Greece .................. 880100115

[51] Int. Cl.$^5$ ............................................ F16K 33/00
[52] U.S. Cl. ........................................ 137/413; 251/65
[58] Field of Search .................. 251/65; 137/430, 412, 137/413

[56] References Cited

U.S. PATENT DOCUMENTS

| | | | |
|---|---|---|---|
| 3,122,155 | 2/1964 | Martinon | 251/65 X |
| 3,212,751 | 10/1965 | Hassa | 251/65 X |
| 3,233,625 | 2/1966 | Pase | 251/65 X |
| 3,527,172 | 9/1970 | Krueger | |
| 3,980,457 | 9/1976 | Smith | 251/65 X |
| 4,059,227 | 11/1977 | Hunter | |
| 4,393,890 | 7/1983 | Skappell | |
| 4,562,855 | 1/1986 | Cummings | 251/65 X |

FOREIGN PATENT DOCUMENTS

| | | |
|---|---|---|
| 480375-A | 12/1975 | U.S.S.R. |
| 1045868-A | 10/1983 | U.S.S.R. |
| 1192732-A | 11/1985 | U.S.S.R. |
| 1276305-A1 | 12/1986 | U.S.S.R. |
| 952817 | 3/1964 | United Kingdom |
| 2041494-A | 9/1980 | United Kingdom |
| 1604599 | 12/1981 | United Kingdom |
| 2210680A | 6/1989 | United Kingdom |

Primary Examiner—Alan Cohan
Attorney, Agent, or Firm—Ladas & Parry

[57] ABSTRACT

The irrigation regulator, 1 and 2, releases water at appropriate intervals of time, which are controlled by the water evaporation rates in an evaporation pan (19). A water level sensor and valve system (7), (14), (9), (15) and (13), release irrigation water from the time the water level in the evaporation pan drops at a certain low level (2), due to evaporation, until is restored to the original high level (1), with the supply of water to the evaporation pan, during irrigation.

Figure 3:
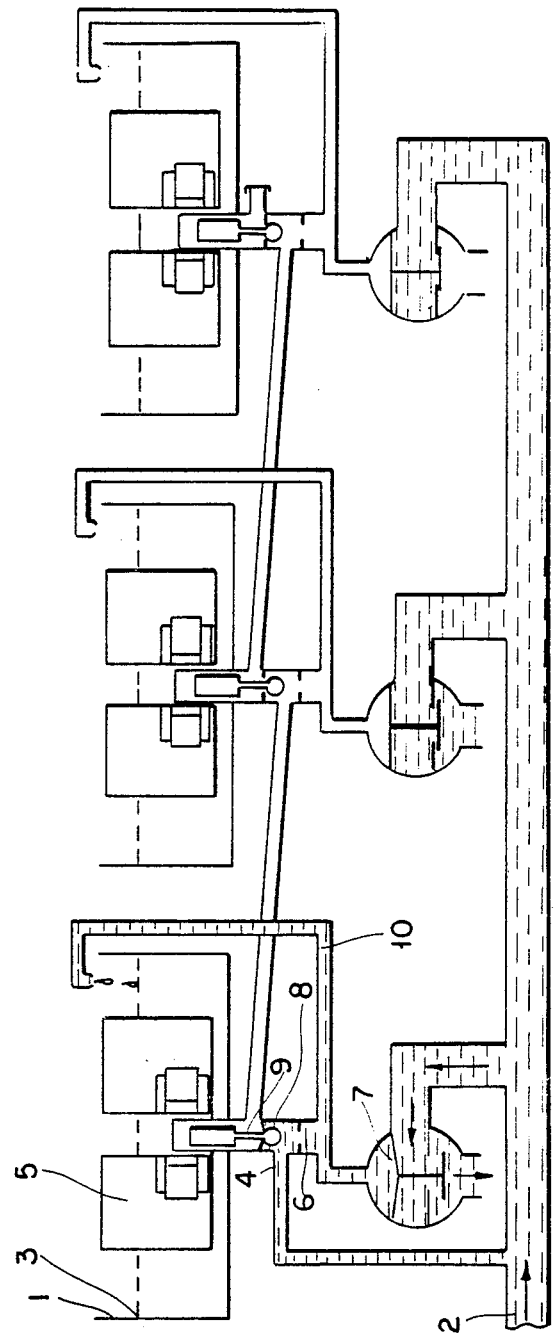
Figure 4:
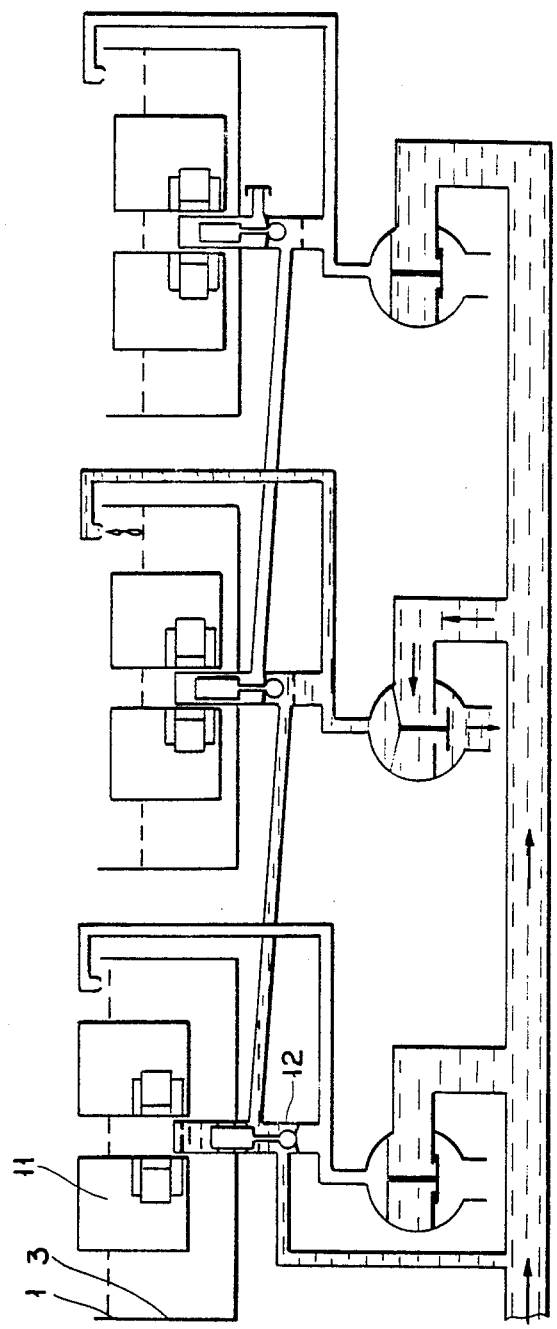
Figure 5:
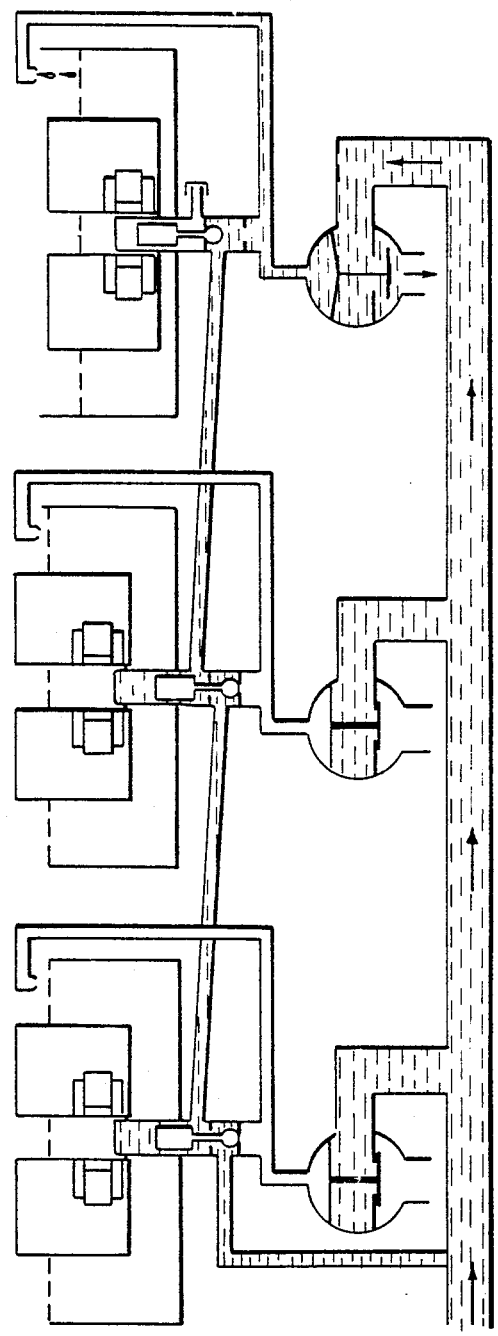

In cases when from a water source a number of sectors of an irrigation network have to be supplied with water available at rates which can satisfy one sector at a time, regulators of a number equal to the number of sectors, with double outlet water valves (8), may be interconnected as shown in the FIGS. 3, 4, and 5, so that when the one regulator delivers water for irrigation, the others do not.

5 Claims, 5 Drawing Sheets

AUTOMATIC IRRIGATION REGULATOR CONTROLLED BY WATER EVAPORATION

The invention described herebelow relates to an automatic irrigation regulator controlled by water evaporation, the evaporation taking place in an evaporation pan, on which suitable attachments are fixed to sense the water level in it and accordingly open or close certain valves, or actuate suitable equipment, to deliver water for irrigation and to return to the evaporation pan the water lost from it by evaporation.

The invention regulates water for irrigation, releasing it at appropriate intervales of time, which are controlled by the evaporation of water in an evaporation pan, the evaporation rates depending on the prevailing weather conditions. The release of water at the appropriate time, is accomplished through proper mechanisms and attachments, sensing the water level in the evaporation pan, when it drops at a certain low level due to the evaporation and stops releasing water, when the water level in the evaporation pan is restored to the original high level, with the supply of water to the evaporation pan, while water is released for irrigation.

The advantages of the invention over other automatic irrigation regulators controlled by timers, are considerable because the soil moisture is consumed by evapotranspiration not at constant rates but as those of evaporation from a free water surface and is influenced in the same way by the weather conditions. So once the invention is adjusted to meet the irrigation requirements of a certain plantation for a certain season, it will deliver for all seasons water when the plantations do need to be irrigated. The invention also does not need electrical power to operate of any kind, being thus most appropriate for the unattented for long time irrigation of remote plantations. However the invention requires to operate piped water, as that supplied to improved irrigation systems i.e. springlers, dip irrigation etc.

Figure 1:
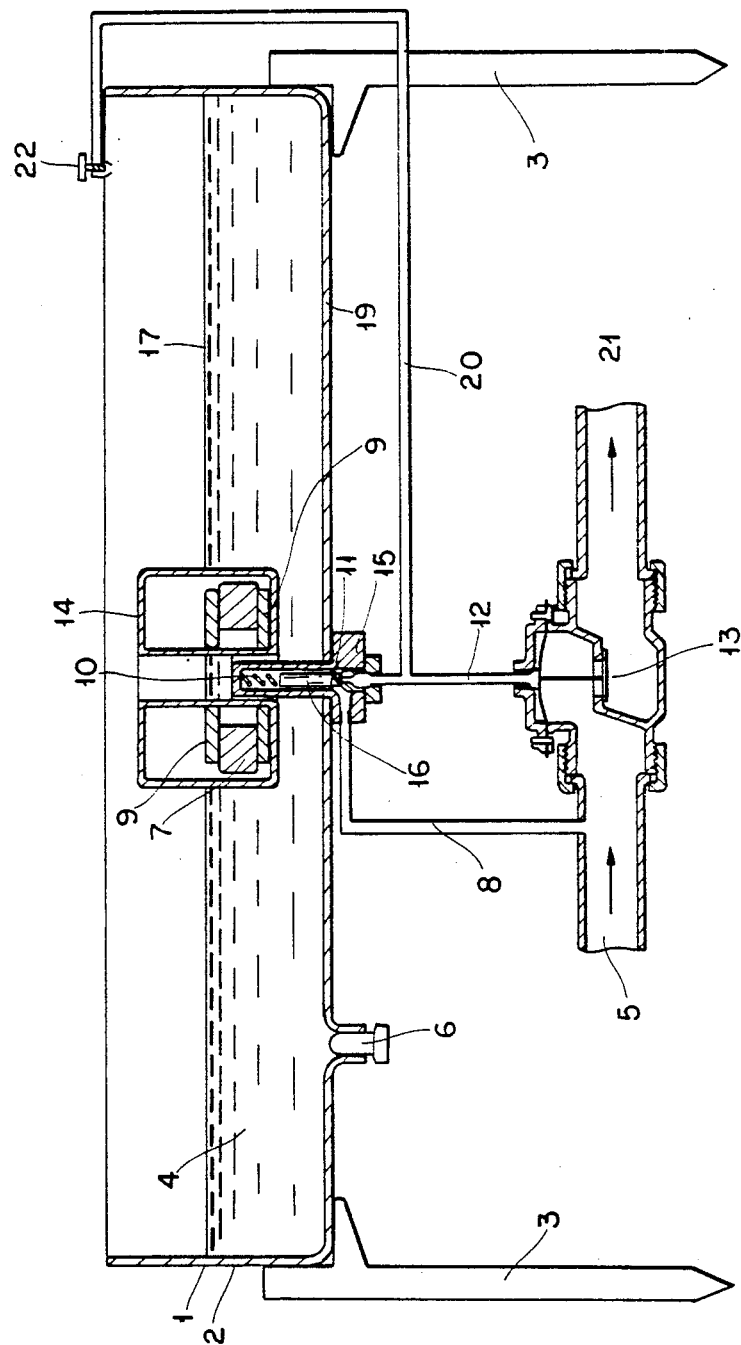
Figure 2:
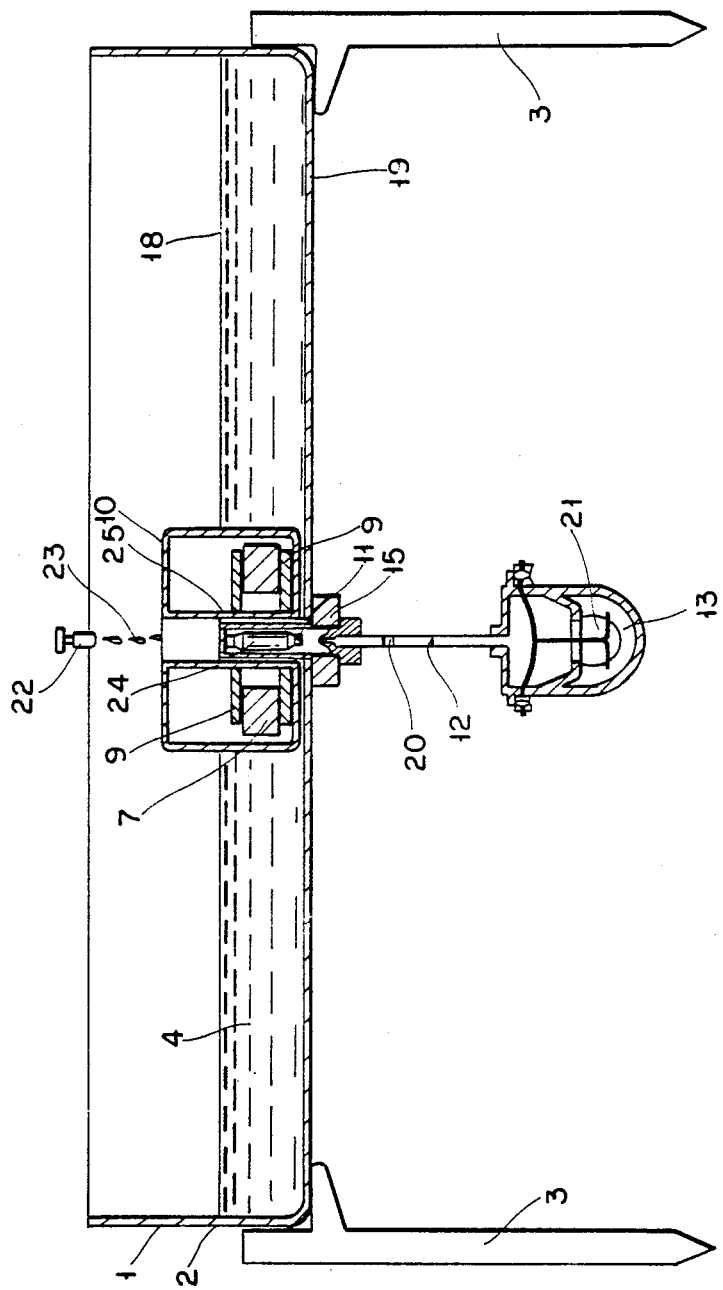

FIGS. 1 and 2 show vertical sections of a regulator in closed and open condition;

FIGS. 3, 4, and 5 show the interconnection of three regulators in different conditions of operation.

A preferred implementation of the invention is the type of the regulator presented in FIGS. 1 and 2 and explained in the text. FIG. 1 presents a vertical section of the regulator along its axis with the water level in the evaporation pan at the high level, as it should be just after a cycle or irrigation is completed and FIG. 2 another vertical section of the regulator along its axis, but at right angles to previous one and with water level in the evaporation pan at the low level, as it should be just after a cycle of irrigation started.

The main parts of the regulator shown in FIG. 1: An evaporation pan (19), containing water (4), the water level of which fluctuates, between a low level (2) and high level (1), due to evaporation and subsequent supply of water equal to that lost by evaporation. A water valve (15), which opens to allow water to pass through, when found in a strong magnetic field and closes, when the magnetic field is removed. A floating magnet composed of: (a) a ring magnet (7), similar to those used on the loudspeakers, with suitable armature (9) to create a strong magnetic field along its axis in its central hole, where the above said magnetic water valve finds itself as the magnet moves vertically downwards following the water level in the evaporation pay, (b) a container (14), in which the magnet is housed, or any other suitable light object on which the magnet is attached for buoyancy. An inlet pipe (8), supplying to the magnetic water valve water under pressure from supply pipe (5). A control pipe (12), for conveying the hydraulic signals from the regulator to the hydraulic valve (13). A feedback pipe (20), delivering water back to the evaporation pan for replacement of what was lost by evaporation and an adjustable flow restrictor (22), fixed on the feedback pipe to control the rate at which water is replaced in the evaporation pan, used to adjust the time during which we want the regulator to keep the irrigation system active. The regulator may be supported by proper supports (3), the evaporation pan may be equipped with a stoppered outlet (6), for cleaning and an adjustable cover, (not shown on the drawing), for suppressing the evaporation rate from the pan, as one of the means to increase the time intervals between the irrigation cycles.

When the regulator is at first installed, properly leveled and filled with water up to the predetermined high level, evaporation starts lowering gradually the water level in the evaporation pan. As the water level is gradually lowered, the floating magnet in the evaporation pan is also lowered. As soon as the water level drops to the certain predetermined low level, the floating magnet, see FIG. 2, approaches enough the magnetic water valve fastened on the bottom of the evaporation pan and opens the valve by pulling up a specific part of the valve made of soft iron, or other suitable magnetic material (24), which, under the tension of a spring (10) and a rubber pad (11), was blocking the outlet of the valve. When the valve opens, pressurised water from the mains, (5) delivered through the inlet pipe (8) is not allowed to pass through the control pipe (12), as a hydraulic "pressure" signal, to activate a suitable hydraulic valve (13), or any other suitable mechanism, which releases water for irrigation to the irrigation network (21). At the same time water (23) though the feedback pipe (20) is supplied to the evaporation pan, to replace that lost by evaporation. The rate at which such water is supplied to an evaporation pan of a particular size, determines the time required for the water level in it to rise from the lower predetermined level to the high predetermined level and can be varied with the flow regulator (22). While the water level in the evaporation pan is gradually raised to reach the high level, the floating magnet, see FIG. 1, is pushed up to the level, for where the moving soft iron part (16) of the valve can not be held by the magnetic force exerted on it by the magnet. So it falls back under the tension of a spring (10) to close the valve, transmitting in this way the "no pressure" signal, through the control pipe to the hydraulic valve, which stops releasing water for irrigation. At the same time the flow of water to the evaporation pan through the feedback pipe stops, the water in the evaporation pan continues to evaporate, its level starts droping again and the same cycle is repeated.

The magnetic water valve actuated by a floating magnet, as described above, which is claimed to be another invention, is most suitable to sense the high and low water levels in the evaporation pan and give the appropriate signals to a hydraulic valve to open or close and it is a preferred implementation of the invention. In other implementations of the invention, the magnetic water valve, which was said to be preferred in the implementation of the invention, may be replaced by other types of magnetic valves, e.g. of the type of electro-valves used in common washing machines, after the actuating coil is removed, which may deliver directly water for irrigation, or may be, the floating magnet and the magnetic water valve may entirely be replaced by other systems sensing the water level in the evaporation pan and, by suitable mechanisms actuate the irrigation system, when the water level in the evaporation pan drops to the predetermined low level, supplying also water to the evaporation pan through a feedback pipe to replace that lost by evaporation and stop irrigation when water in the evaporation pan reaches the high level. In cases, where the invention is implemented on regulators used to control pumping units supplying water to irrigation systems, the magnetic water valve may be replaced by an electrical switch with suitable attachments, which, by sensing the high and low water level in the evaporation pan, may be set off and on accordingly, to appropriately control the operation of the pumps or other equipment through which water is supplied for irrigation. With such an arrangement the feedback pipe is connected to the irrigation network, so that water is supplied to the evaporation pan to replace what was lost by evaporation as long as the irrigation network remains active, the control pipe is replaced by control cables and the hydraulic signals by electrical ones, which through suitable attachments start and stop the pumps.

In practice there are cases of extensive fields to be irrigated with water supplied at a rate which can not satisfy the entire irrigation network at once. In those cases it is necessary to divide the network into sectors, which must be supplied with water in turn, one at a time. Such cases require the installation of a number of regulators equal to the number of the sectors at which the irrigation network is divided. To achieve the purpose the water valves fixed on the regulators have to be with double outlets and interconnected in a way, which is also claimed to be an invention and will be explained with the diagrams presented in FIGS. 3, 4 and 5.

It will be noticed, see FIG. 3, that the water valves (8), shown diagrammatically on the drawings, have one inlet (4), one upper outlet (9) and one lower outlet (6). The valve is such that when the lower outlet is open the upper one is closed and when the upper outlet is open the lower is closed. The words "upper" and "lower" are used here to explain the invention, the real valve being allowed to have any orientation, as long as it can, through suitable mechanism, open its outlet and close the other when the water level in the evaporation pan drops to the low level (3) and open its closed outlet, while closing the open one, see drawing D, when the water level in the evaporation pan rises to the high level (1).

The interconnection of three such regulators is diagrammatically shown in the FIGS. 3, 4 and 5. The routes that the water (2), supplied from the mains under pressure. follows at various stages of the operation of the system are also shown. In FIG. 3 all three regulators have in their evaporation pan the water level (3) at the low level, the floating magnet (5) at its lowest position and the magnetic water valve (8) with its upper outlet (9) closed and the lower outlet (6) open. Under the conditions of FIG. 3 the hydraulic signal of "pressure" is delivered to the hydraulic valve (7) of the first regulator, which opens to deliver water for the irrigation of the first sector, while water, through the feedback pipe (10), is supplied to the evaporation pan of the first regulator. When in the evaporation pan of the first regulator, see FIG. 4, the water level rises to the high level (1), the floating magnet (11) is pushed by the water up, the magnetic valve, which is not now under the influence of the magnet, changes status (12) so that the lower outlet of the valve closes while the upper one opens and the hydraulic signal of "pressure" can not reach the hydraulic valve of the first regulator, which in this way is deactivated, while it can reach the hydraulic valve of the second regulator, which is now activated. So under the conditions of FIG. 4 the second regulator only is active, activating also the corresponding hydraulic valve to release water for the second sector and at the same time to supply water to the evaporation pan of the second regulator. The second regulator responds now in the way described for the first one and so when enough water is released for the irrigation of the second sector, during the time required for the water level in the corresponding evaporation pan to rise from the low to the high level, the hydraulic signal of "pressure " is now transmitted to the third regulator as clearly shown in FIG. 5. The third regulator behaves also like the previous two and when the water level in the corresponding evaporation pan reaches the high level and the irrigation of the third sector is also completed, the system will close and remain idle, until evaporation will lower the water level in the evaporation pans to the low level and the same cycle is again repeated.

I claim:

1. A magnetic water valve actuated by a floating magnet comprising:

a water containing water;

a floating magnet floating in said water and moving up and down as a level of said water fluctuates comprising a float means having a ring magnet attached thereto, a two piece armature attached to said ring magnet at opposite ends thereof to substantially confine a magnetic field generated by said magnet to a space between the two pieces of said armature of said ring magnet on and around an axis thereof;

a magnetic water valve located in said container, said valve being opened when said magnet and armature approaches said valve to allow water to flow therethrough and being closed when said magnet and armature move away from said valve so that said valve is not under the influence of said magnetic field, said valve being closed by a rubber pad closing an outlet of said valve under the force of a spring.

2. The magnetic valve according to claim 1 wherein said armature comprises two flattened rings in the form of washers made of a magnetic material.

3. The magnetic valve according to claim 1 for use as an irrigation regulator wherein said water container comprises an evaporation pan, said floating magnet and said water valve comprise a sensing means for sensing the water level in said evaporation pan for controlling irrigation means, said evaporation pan having supply means coupled to an outlet of said water valve for supplying said pan with an amount of water equal to that lost by evaporation when said water valve is open.

4. The magnetic valve according to claim 3 wherein said armature comprises two flattened rings in the form of washers made of a magnetic material.

5. The magnetic valve according to claim 3 wherein a plurality of valves are coupled together, each of said valves having one inlet and two outlets, means for opening one of said outlets while closing the other, said valves being interconnected so that not all of said valves are active to deliver water at the same time.

* * * * *